(12) United States Patent
Chien

(10) Patent No.: US 8,694,440 B2
(45) Date of Patent: Apr. 8, 2014

(54) CONSOLIDATION YIELD MANAGEMENT SYSTEM AND METHOD

(75) Inventor: Yao-Huai Chien, Taipei (TW)

(73) Assignee: Dimerco Express (Taiwan) Corporation, Taipei (TW)

(*) Notice: Subject to any disclaimer, the term of this patent is extended or adjusted under 35 U.S.C. 154(b) by 270 days.

(21) Appl. No.: 13/078,000

(22) Filed: Apr. 1, 2011

(65) Prior Publication Data

US 2012/0254057 A1   Oct. 4, 2012

(51) Int. Cl.
*G06Q 30/00* (2012.01)
*G06Q 10/08* (2012.01)

(52) U.S. Cl.
CPC .............. *G06Q 10/08* (2013.01); *G06Q 10/083* (2013.01); *G06Q 10/0875* (2013.01)
USPC ......................................... 705/330

(58) Field of Classification Search
CPC .. G06Q 10/08; G06Q 10/083; G06Q 10/0875
USPC ........................................................ 705/330
See application file for complete search history.

(56) References Cited

U.S. PATENT DOCUMENTS

2005/0149453 A1* 7/2005 Amling et al. ................... 705/60
2006/0116893 A1* 6/2006 Carnes et al. ...................... 705/1

* cited by examiner

Primary Examiner — Allen J Jung

(57) ABSTRACT

A consolidation yield management system and method is provided in the present invention, which is applicable to a network system to implement a real-time consolidation. The consolidation yield management system includes at least one skirt server and a hub server. The skirt server chooses whether to build consol of its skirt Master Air Waybill or skirt Master Air Waybill to a hub Master Air Waybill of the hub server, and generates a hub Master Air Waybill number according to the hub Master Air Waybill, thus finishing the operation of building consol.

4 Claims, 10 Drawing Sheets

CONSOLIDATION YIELD MANAGEMENT SYSTEM AND METHOD

BACKGROUND OF THE INVENTION (a) Technical Field of the Invention

The present invention relates to a consolidation yield management system and method. More particularly, the present invention relates to a consolidation yield management system and method having operations of non-building consol and building consol.

(b) Description of the Prior Art

Because of enterprise internationalization and changing of business type, many enterprises purchase products in a way of "multi-country, multi-type, and small quantity" and provide integral management control over production and sale, and as a result, the demands for breakdown and consolidation all around the world are increasing. It is beneficial for freight forwarders, and for consigners (cargo owners), a traditional port-to-port bulk freight transportation system in an early stage has been promoted to a door-to-door transportation manner through complete intermodal transportation services provided by the freight forwarders under the development of freight unitization and container transportation. The marine freight forwarding industry establishes an integral transportation chain network in conformity with the requirements of an instantaneously variable market to provide convenient services for clients.

The transportation industry relates to freight forwarding services including the ship transportation operator, shipping agency and marine freight forwarder. Among them, the freight collected by the ship transportation industry and shipping agency industry is mainly in the form of a full container load, and the freight collected by the marine freight forwarder includes full container loads and partial container loads. However, the marine freight forwarder mainly focuses on partial container load service. The freight forwarder builds consol in which the freight collected from different cargo owners is consolidated into a full container load and then delivers the freight to the ship transportation operator in the form of full container loads, so as to earn the differential rate of transportation.

Along with the development of the container transportation, the convergence of a primary route and a secondary route of the containership routing gradually forms a port of transshipment (i.e. a hub station) of containers. Besides the full container load transportation, the freight of partial container loads and the freight from different departures are consolidated into a full container load and then transported to a destination, so as to reduce the transportation cost. Manufacturers or freight forwarders collect the breakbulk containers from the neighboring countries at a hub port of multicountry consolidation (i.e. a skirt station), and consolidate them according to the same terminal port, thereby reducing the transportation cost.

Therefore, it is disclosed in the present invention how to invent a consolidation yield management method and system to consolidate the freight from a skirt station at a hub station.

SUMMARY OF THE INVENTION

The present invention mainly aims to provide a consolidation yield management method and system, in which a skirt station server is connected to a hub server through a network system to perform the operation of non-building consol or build consol, so that the freight from the skirt station is consolidated to the hub station, thereby achieving the purpose of consolidation management.

To achieve the above and other objectives, the present invention is directed to providing a consolidation yield management method, which adopts computer network automation operations to provide online management control over a consolidation yield management system in full scale, including the following steps: providing at least one skirt server, used for establishing a skirt House Air Waybill (HAWB) or a skirt Master Air Waybill (MAWB) of a skirt station; providing a hub server, connected with the skirt server through a network system, for receiving and combining the skirt House Air Waybill to a hub station to establish a hub Master Air Waybill; the skirt server chooses to perform an operation of building consol or an operation of non-building consol; if the skirt server chooses to perform the operation of non-building consol, the skirt server establishes the skirt House Air Waybill, generates a skirt House Air Waybill number correspondingly, and then transfers the skirt House Air Waybill and the skirt House Air Waybill number to the hub server; the hub server chooses whether to build consol of the skirt House Air Waybill or not; and, if the hub server chooses to build consol of the skirt House Air Waybill, the hub server builds consol of the skirt House Air Waybill to the hub Master Air Waybill, generates a hub Master Air Waybill number corresponding to the hub Master Air Waybill, and then transfers the hub Master Air Waybill number to the skirt server.

The present invention is also directed to providing a consolidation yield management system, which is applicable to a network system and capable of implementing real-time consolidation. The system includes at least one skirt server, and a hub server. The at least one skirt server is disposed at a skirt station and includes: a skirt consolidation yield module, for determining to generate a skirt House Air Waybill or a skirt Master Air Waybill according to skirt freight and the selection of an operation of building consol or non-building consol; a skirt data input/output module, for transferring the skirt House Air Waybill or the skirt Master Air Waybill; and a skirt storage module, for storing the skirt House Air Waybill or the skirt Master Air Waybill. The hub server is disposed at a hub station and connected with the skirt server through the network system, and includes: a hub consolidation yield module, for generating a hub Master Air Waybill; a hub data input/output module, for transferring the hub Master Air Waybill and receiving the skirt House Air Waybill or the skirt Master Air Waybill; and a hub storage module, for storing the hub Master Air Waybill. The hub consolidation yield module chooses whether to build consol of the skirt House Air Waybill or the skirt Master Air Waybill to the hub Master Air Waybill, and generates a hub Master Air Waybill number according to the hub Master Air Waybill. The hub data input/output module transfers the hub Master Air Waybill number to the skirt consolidation yield module. The skirt consolidation yield module stores the hub Master Air Waybill number to the skirt storage module.

BRIEF DESCRIPTION OF THE DRAWINGS

FIG. 4 shows a picture of inputting a skirt House Air Waybill;

FIG. 5 shows another picture of inputting a skirt House Air Waybill;

FIG. 7 shows a picture of a building-consol operation window;

FIG. 8 shows a page of a hub Master Air Waybill of a hub server;

DETAILED DESCRIPTION OF THE PREFERRED EMBODIMENTS

In order to realize the purpose and translate concerned technical plan with advantages of the present invention, the following is detailed description of the technical plan in accordance with the principles of the present invention, considering specific embodiments and attached figures.

Figure 1:
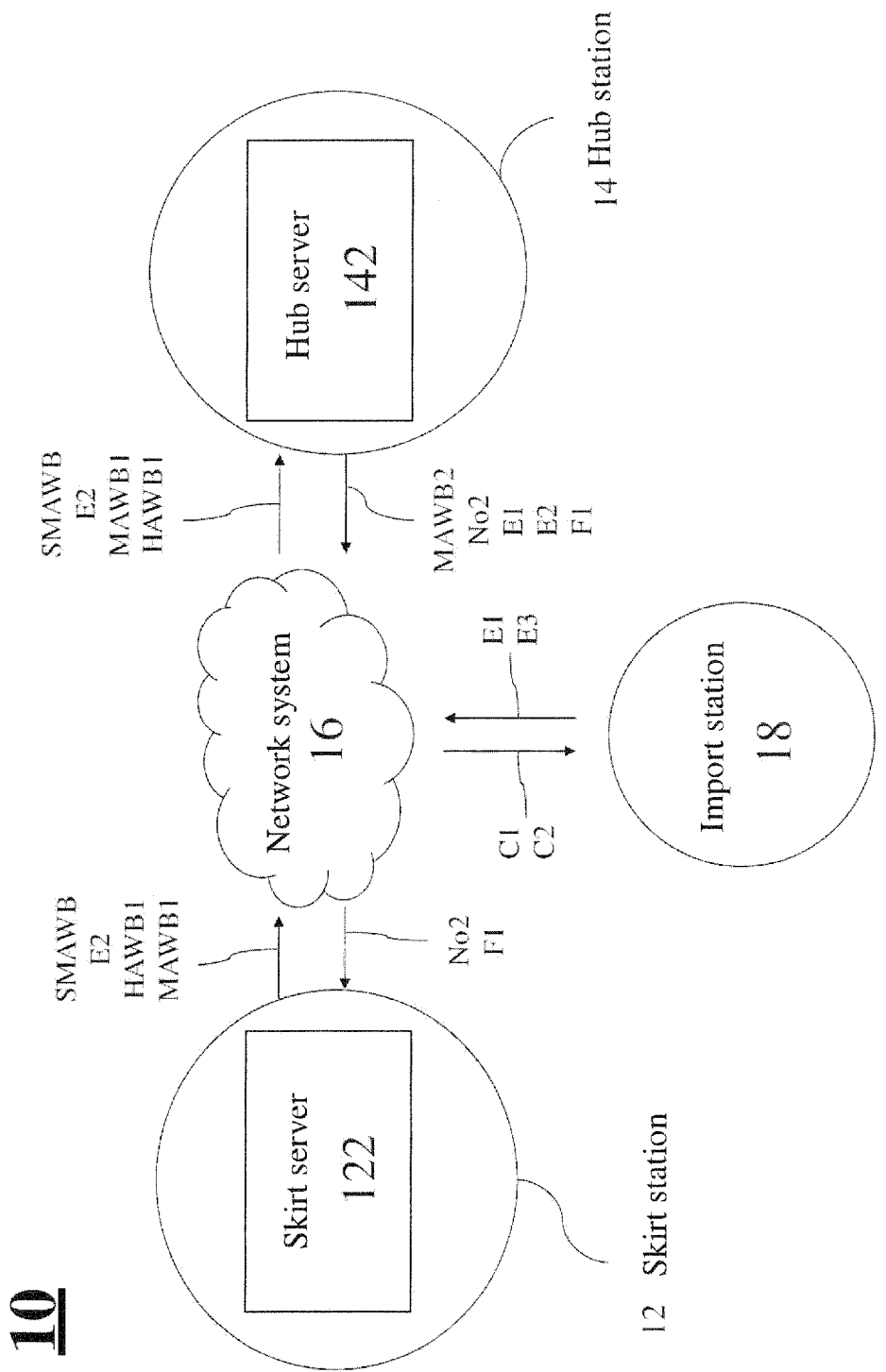
FIG. 1 is a schematic view of a consolidation yield management system according to a preferred embodiment of the present invention.
Figure 2:
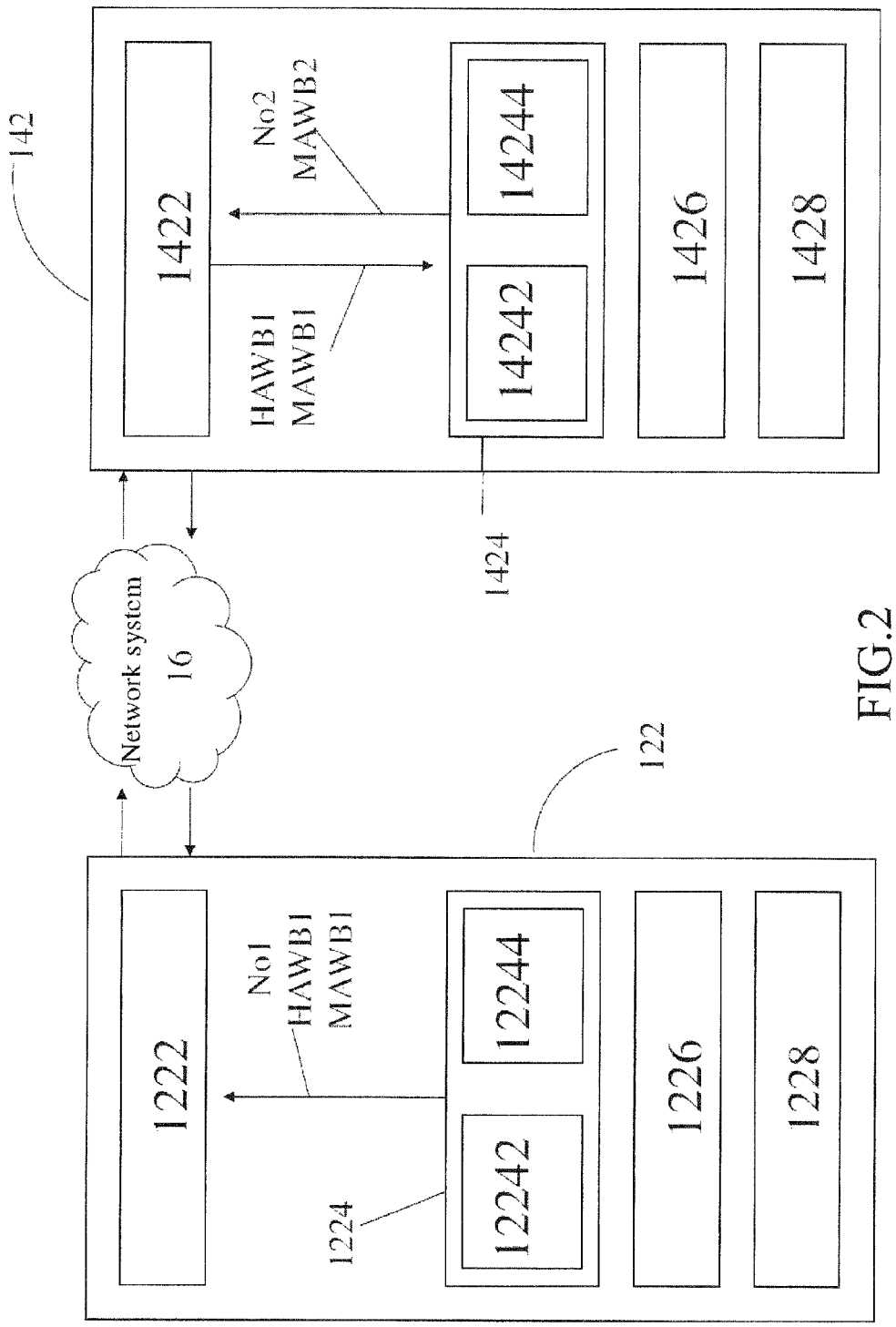
FIG. 2 is a schematic view of the hardware architecture of a hub server and a skirt server of the consolidation yield management system illustrated according to the preferred embodiment of FIG. 1.

Referring to FIGS. 1 and 2, FIG. 1 is a schematic view of a consolidation yield management (CYM) system according to a preferred embodiment of the present invention. FIG. 2 is a schematic view of the hardware architecture of a hub server 142 and a skirt server 122 of the consolidation yield management system illustrated according to the preferred embodiment of FIG. 1. The consolidation yield management system 10 is applicable to a network system 16 and is capable of implementing a real-time consolidation of a skirt station 12 and a hub station 14. The consolidation yield management system 10 includes: a skirt server 122 disposed at the skirt station 12 and a hub server 142 disposed at the hub station 14. The skirt server 122 is linked to the hub server 142 through a network system 16. It should be noted that, in FIG. 1, only one skirt server 122 is linked to the hub server 142 for illustration, but the hub server 142 of the present invention may be linked with more than one skirt server 122, so that a plurality of skirt servers 122 build consol of their freight to the hub server 142 at the same time.

Referring to FIG. 2, the skirt server 22 is disposed at the skirt station 12. The skirt server 22 includes: a skirt consolidation yield module 1224, a skirt data input/output module 1222, and a skirt storage module 1228. The skirt consolidation yield module 1224 is used for determining to generate a skirt House Air Waybill HAWB1 or a skirt Master Air Waybill MAWB1 according to a skirt freight (i.e. the freight to be transported by the skirt station 12) and the selection of an operation of building consol or non-building consol. The skirt data input/output module 1222 is used for transferring the skirt House Air Waybill HAWB1 or the skirt Master Air Waybill MAWB1. The skirt storage module 1228 is used for storing the skirt House Air Waybill HAWB1 or the skirt Master Air Waybill MAWB1.

The hub server 142 is disposed at the hub station 14. The hub server 142 is connected with the skirt server 122 through the network system 16. The hub server 142 includes: a hub consolidation yield module 1424, a hub data input/output module 1422, and a hub storage module 1428. The hub consolidation yield module is used for generating a hub Master Air Waybill MAWB2. The hub data input/output module 1422 is used for transferring the hub Master Air Waybill MAWB2 and receiving the skirt House Air Waybill HAWB1 or the skirt Master Air Waybill MAWB1. The hub storage module 1428 is used for storing the hub Master Air Waybill MAWB2.

The hub consolidation yield module 1424 may choose whether to build consol of the skirt House Air Waybill HAWB1 or the skirt Master Air Waybill MAWB1 to the hub Master Air Waybill MAWB2. The hub consolidation yield module 1424 generates a hub Master Air Waybill number No2 according to the hub Master Air Waybill MAWB2. After that, the hub data input/output module 1422 transfers the hub Master Air Waybill number No2 to the skirt consolidation yield module 1224. Finally, the skirt consolidation yield module 1224 stores the hub Master Air Waybill number No2 to the skirt storage module 1228. The skirt server 122 of the skirt station 12 finishes building consol of the skirt freight to the hub server 142 of the hub station 14, and the skirt server also knows that the hub Master Air Waybill number No2 with the consol of the skirt freight built is the relevant carrier data.

In another embodiment, referring to FIG. 2, the skirt consolidation yield module 1224 further includes a skirt House Air Waybill module 12242, and the hub consolidation yield module 1424 further includes a hub House Air Waybill module 14242. When the skirt House Air Waybill module 12242 chooses to non-build consol, the skirt consolidation yield module 1224 generates the skirt House Air Waybill HAWB1 and generates a skirt House Air Waybill number No1 corresponding to the skirt House Air Waybill HAWB1. The skirt data input/output module 1222 transfers the skirt House Air Waybill to the hub data input/output module 1422. The hub data input/output module 1422 transfers the skirt House Air Waybill HAWB1 to the hub House Air Waybill module HAWB2.

In yet another embodiment, the skirt consolidation yield module 1224 further includes a skirt Master Air Waybill module 12244, and the hub consolidation yield module 1424 further includes a hub Master Air Waybill module 14244. When the skirt Master Air Waybill module chooses to build consol, the skirt Master Air Waybill module 12244 generates the skirt Master Air Waybill MAWB1. The skirt data input/output module 1222 transfers the skirt Master Air Waybill MAWB1 to the hub data input/output module 1422. The hub Master Air Waybill module 14244 generates the hub Master Air Waybill number No2 corresponding to the skirt Master Air Waybill MAWB2. The hub data input/output module 1422 transfers the skirt Master Air Waybill number No2 and the Carrier Book F1 to the hub data input/output module 1422.

In another embodiment, the skirt server 122 further includes a skirt application module 1226, and the hub server 142 further includes a hub application module 1426. The skirt application module 1226 and the hub application module 1426 are used for performing a building-consol plan in advance, synchronizing the skirt House Air Waybill HAWB1 between the hub server and the skirt server in real time and calculating the excesses of the skirt server 122 and the hub server 142. The hub application module 1428 generates a hub electronic warehouse receipt E1, transfers it through the hub data input/output module 1422 to the import station 18 via the network system 16, as shown in FIG. 1, and then calculates an estimated cost C1 and transfers the estimated cost C1 to the skirt server 122.

Figure 3:
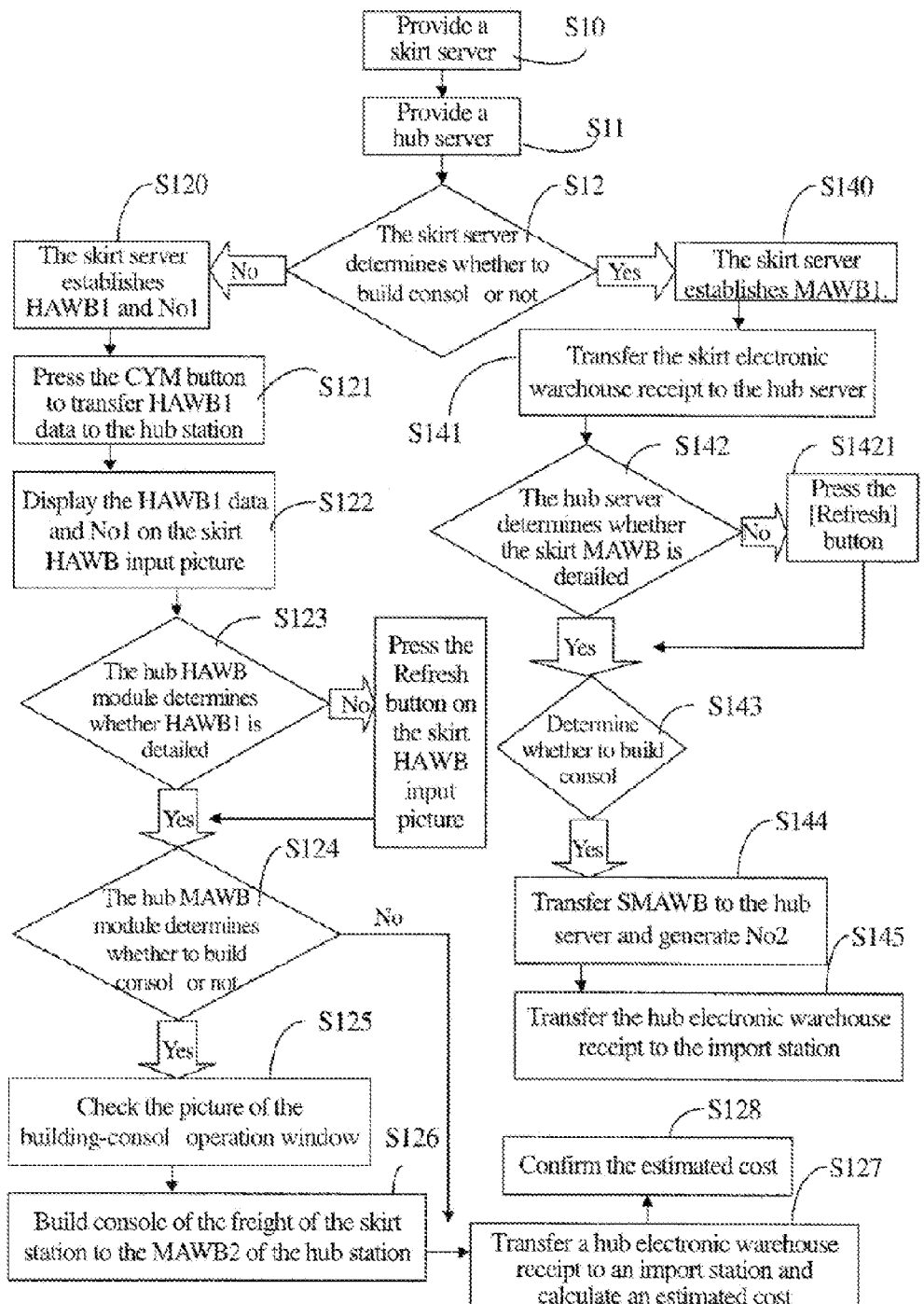
FIG. 3 is a flow chart of a consolidation yield management method of the present invention.

In yet another embodiment, referring to FIGS. 2 and 3, FIG. 3 is a flow chart of a consolidation yield management method of the present invention. As shown in FIG. 3, the consolidation yield management method adopts computer network automation operations to provide online management control over the consolidation yield management system 10 via the network system 16 in full scale. In Step S10, at least one skirt server is provided for establishing a skirt House Air Waybill HAWB1 or a skirt Master Air Waybill MAWB1 of the skirt station 12. In Step S11, a hub server 122 is provided, which is connected with the skirt server 122 through the network system 16, for receiving and combining the skirt House Air Waybill HAWB1 to the hub station 14 to establish the hub Master Air Waybill MAWB2.

Figure 4:
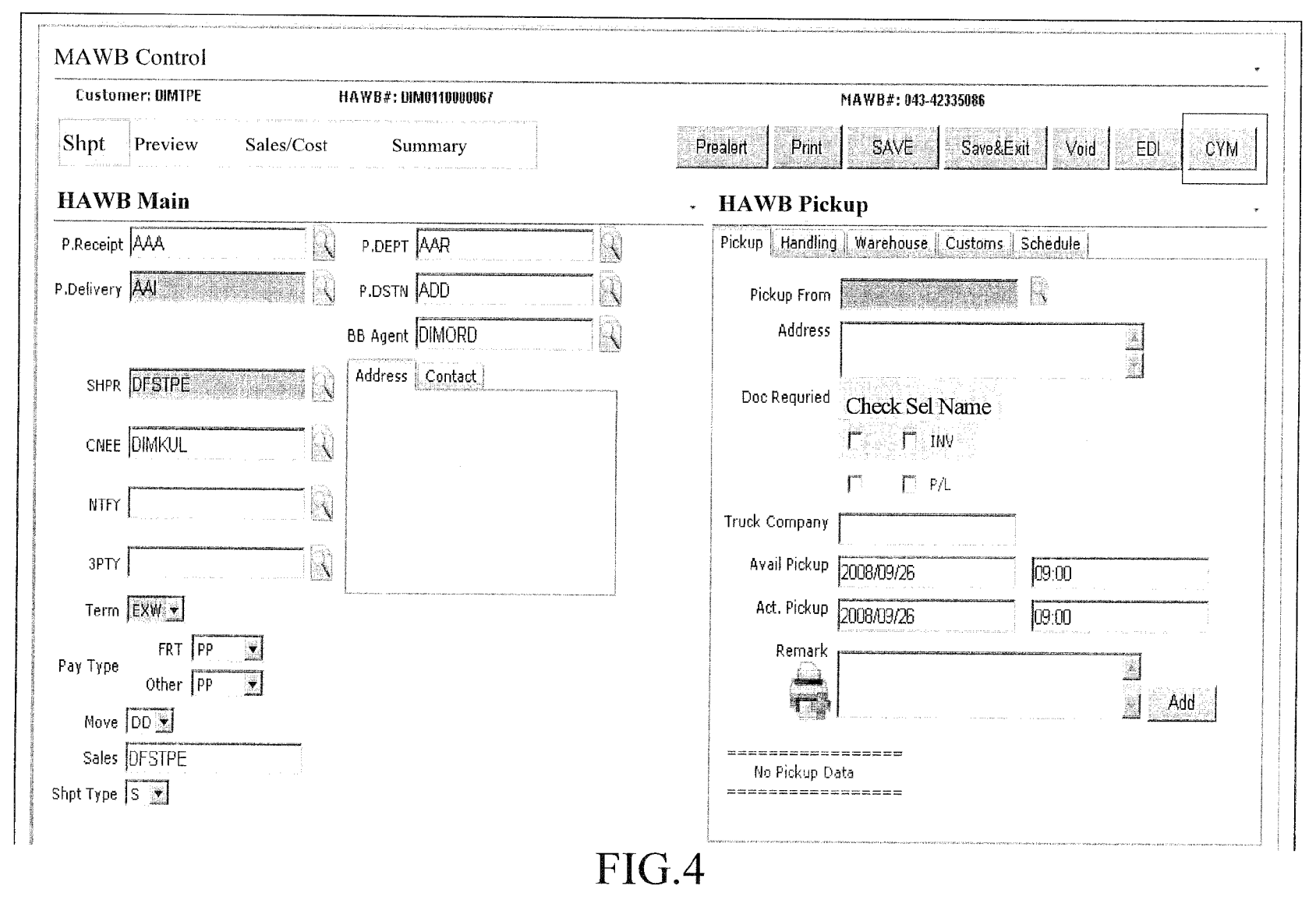

In Step S12, the skirt server 122 determines whether to build consol or not. If it determines to build consol, the skirt server 122 selects an operation of building consol. Alternatively, if it determines to non-build consol, the skirt server 122 selects an operation of non-building consol. In Step S120, if the skirt server 122 determines to non-build consol and selects the operation of non-building consol, the skirt server 122 provides a user of the skirt station 12 with the data input skirt House Air Waybill module 12242 for filling in the skirt House Air Waybill HAWB1 according to the quantity of the skirt freight. Referring to FIG. 4, FIG. 4 shows a picture of inputting a skirt House Air Waybill. In Step S121, the skirt House Air Waybill input picture 400 displays a CYM button. When the filling of the skirt House Air Waybill HAWB1 is finished, the user confirms the skirt House Air Waybill HAWB1 and presses the CYM button. The skirt House Air Waybill module 12242 establishes the skirt House Air Waybill HAWB1 and generates the skirt House Air Waybill number No1 correspondingly. Then, the skirt data input/output module 1222 transfers the skirt House Air Waybill number No1 and the skirt House Air Waybill HAWB1 to the hub data input/output module 1422 of the hub server 142. In Step S122, when the skirt House Air Waybill HAWB1 builds consol to the hub server 142, the skirt House Air Waybill input picture presents the skirt House Air Waybill HAWB1 data and the skirt House Air Waybill number No1 in real time.

Figure 5:
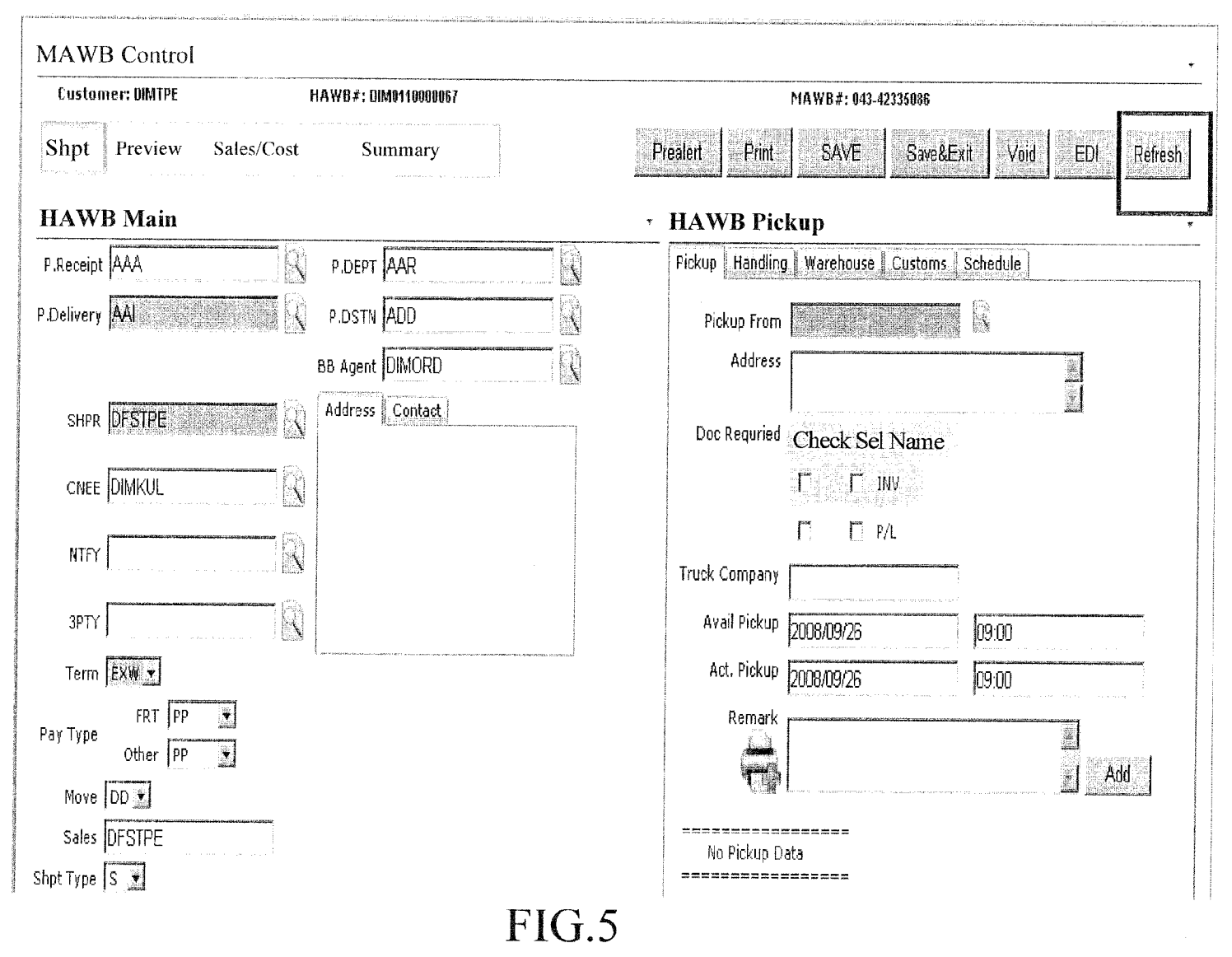

Referring to FIG. 5, FIG. 5 shows another picture of inputting a skirt House Air Waybill. In Step S123, the hub House Air Waybill module 14242 determines whether the data of the skirt House Air Waybill HAWB1 is detailed. If the data is not detailed, proceed to Step S1231, in which the hub server 142 goes to the skirt House Air Waybill input picture and presses the Refresh button. It should be noted that this embodiment also includes a step of synchronizing the skirt House Air Waybill HAWB1 between the hub server 142 and the skirt server 122 in real time.

In Step S124, the hub Master Air Waybill module 14244 of the hub server 142 determines whether to build consol of the skirt House Air Waybill HAWB1 or not.

Figure 6:
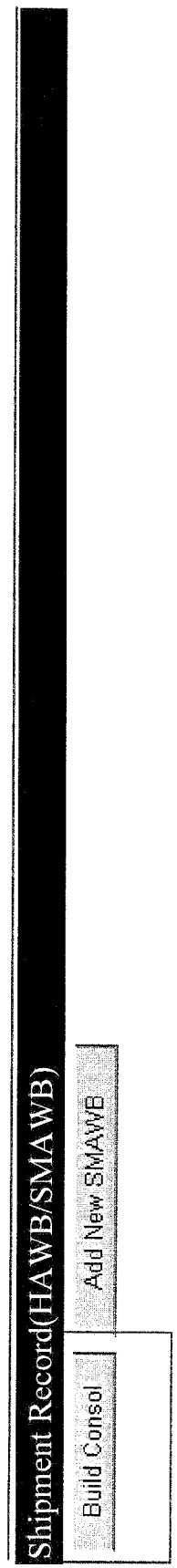
FIG. 6 shows a picture of a hub Master Air Waybill.
Figure 7:
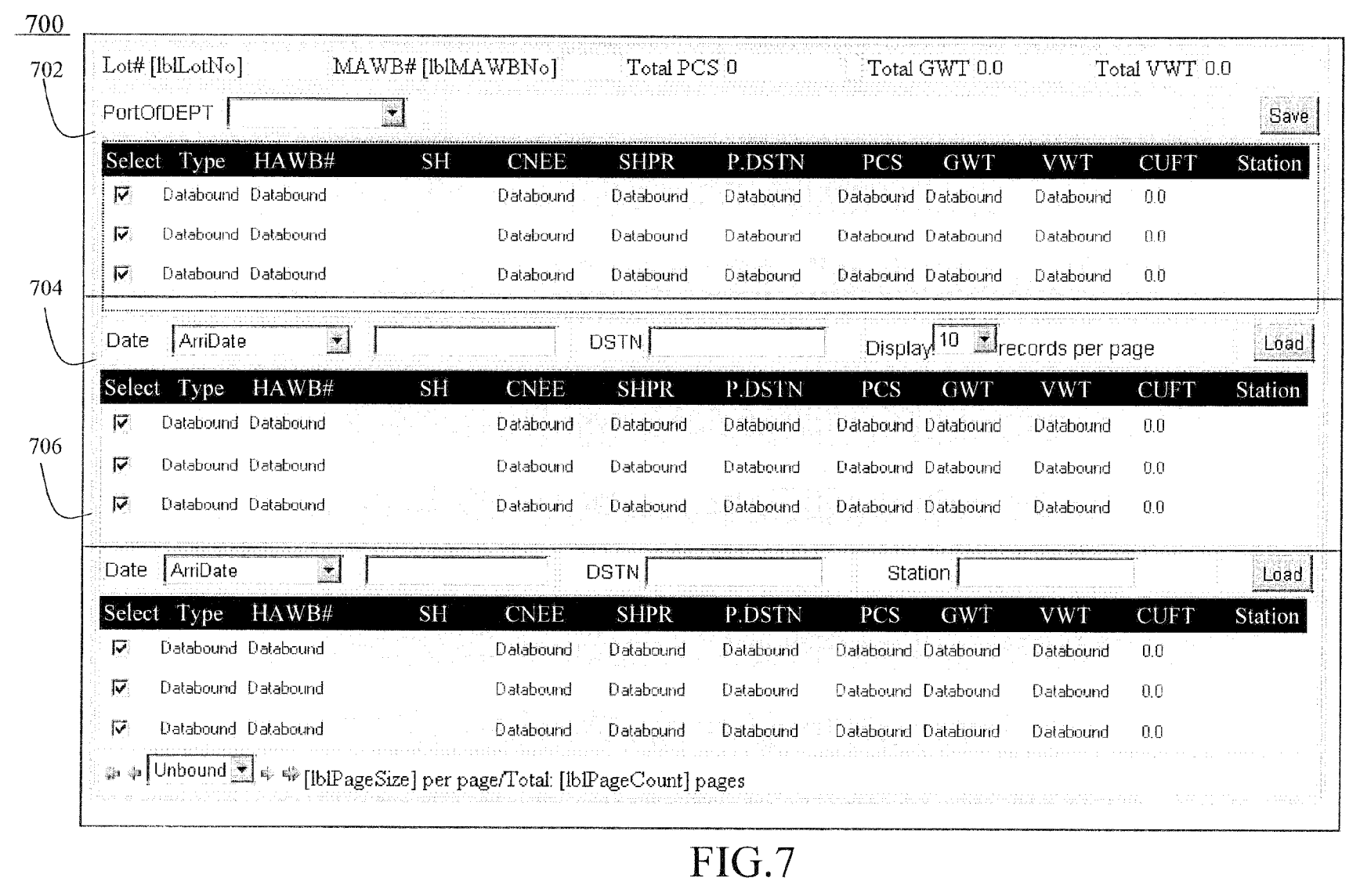

Referring to FIGS. 6 and 7, FIG. 6 shows a picture of a hub Master Air Waybill. FIG. 7 shows a picture of a building-consol operation window. In Step S125, if the hub Master Air Waybill module 14244 determines to build consol, the hub Master Air Waybill module 14244 establishes the hub Master Air Waybill MAWB2 in advance, as shown in FIG. 6, and presses the Build Consol button and meanwhile displays the picture of a building-consol operation window, as shown in FIG. 7.

Referring to FIG. 7, the building-consol operation window picture 700 is divided into three blocks, which are block A, 702, block B, 704, block C, 706. The block A, 702 includes a consol manifest and information of shipment including Total PCS, Total GWT, Total VWT, etc. The block B, 704 includes two Search criteria, Date and DSTN, which are provided for the user to search for the hub House Air Waybill HAWB2 of the hub server 1422. The block C, 706 includes three Search criteria, Date, DSTN and Station, which are provided for the user to search for the skirt House Air Waybill HAWB1 of the skirt server 122.

In Step S125, the user may set the two Search criteria Date and DSTN (City Code) in the block B, 704, and presses the [Load] button for searching. The system displays the hub House Air Waybill HAWB2 of the hub station 14 meeting the conditions in the manifest of the block B, 704, and the user may check the House Air Waybill (HAWB1 or HAWB2) for building consol. When checking, the Total PCS, Total GWT and Total VWT in the block A, 702 are updated in time, and the total information may be correctly calculated to provide reference to the result of building consol for the user in advance. The operation of the block C, 706 is the same as that of the block B, 704, and the user may use the Station Search criteria to set the skirt House Air Waybill HAWB1 of the skirt station 12 for searching.

Figure 8:
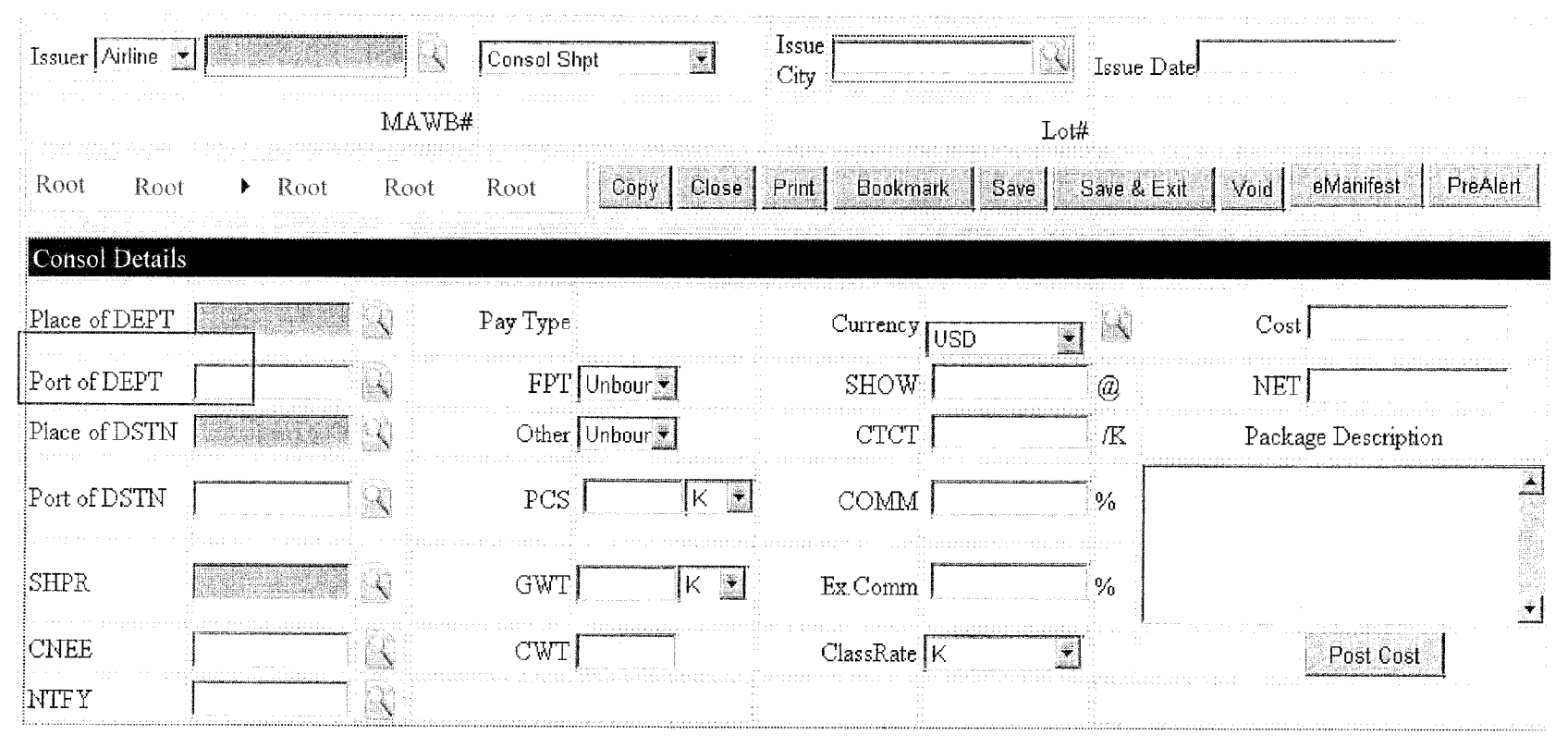

After finishing checking in the manifests of the block B, 704 and block C, 706, the user may press the [Save] button in the block A, 702 to confirm adding the checked HAWBs to the consol manifest of the block A, 702. The system adds the checked records in the manifests of the block B, 704 and the block C, 706 to the consol manifest in block 1. After the consol is built, the user may select a proper Port Code in the PortOfDEPT of the block A, 702 and closes the building-consol operation window 700, and then the consolidation yield management system 10 brings the PortOfDEPT to the PortOfDEPT field on the page of hub Master Air Waybill MAWB2, as shown in FIG. 8. FIG. 8 shows a page of a hub Master Air Waybill of the hub server 142.

In Step S126, the consol of the skirt House Air Waybill HAWB1 of the skirt station 12 is built to the hub Master Air Waybill MAWB2 of the hub station 14 to finish building consol of the freight of the skirt station 12 to the hub station 14 and to generate a hub Master Air Waybill number No2 corresponding to the hub Master Air Waybill HAWB2. The hub data input/output module transfers the hub Master Air Waybill number No2 to the skirt server 122.

In Step S127, the hub application module 1428 of the hub server 142 transfers a hub electronic warehouse receipt E1 to an import station 18 to calculate an estimated cost C1, and transfers the estimated cost C1 to the skirt server 122. The hub application module 1428 of the hub server 142 performs a confirmation step according to the estimated cost C1.

The hub data input/output module 1422 of the hub server 142 transfers a hub electronic warehouse receipt E1 to an import station 18 to calculate an estimated cost C1 and transfers the estimated cost C1 to the skirt server 122.

In Step S128, the hub server 142 makes a confirmation according to the estimated cost C1. After receiving the bill of the hub station 14, the skirt station 12 makes confirmation of the cost.

In yet another embodiment, in Step S124, if the hub Master Air Waybill module 14244 of the hub server 142 determines not to build consol of the skirt House Air Waybill HAWB1, directly proceed to Step S127.

In yet another embodiment, referring to FIG. 3, in Step S140, if the skirt server 122 chooses to build consol, the skirt Master Air Waybill module 12244 of the skirt server 122 establishes the skirt Master Air Waybill MAWB1.

Figure 9:
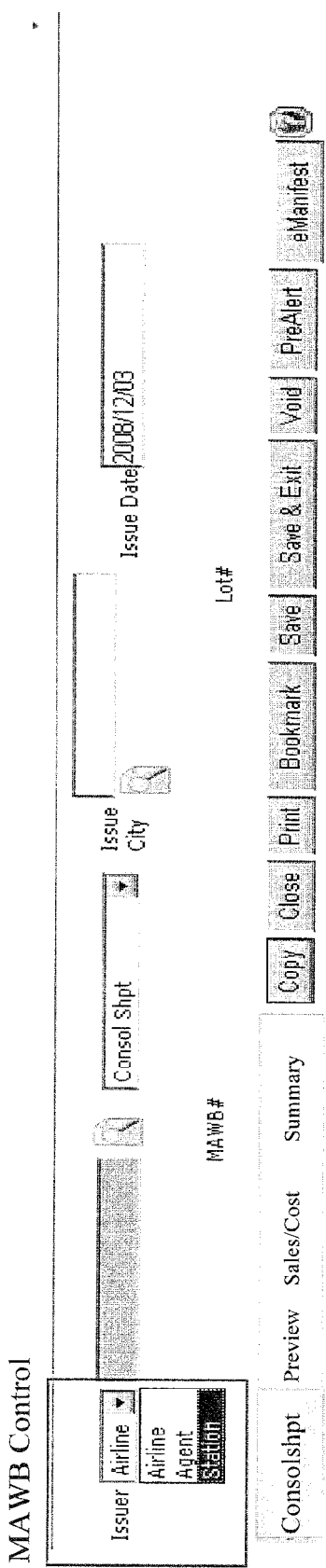
FIG. 9 shows a picture of a skirt Master Air Waybill.
Figure 10:
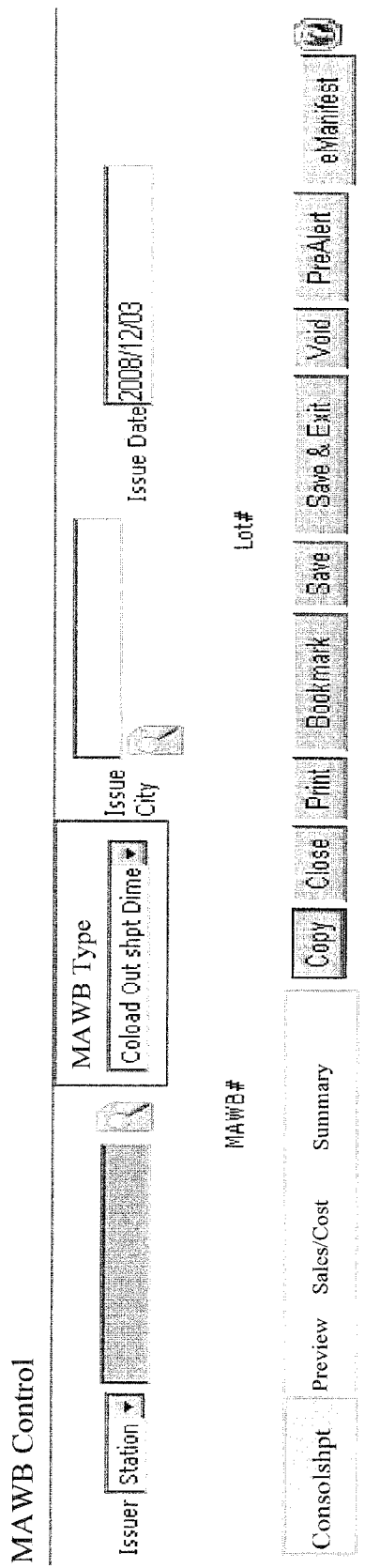
FIG. 10 shows another picture of a skirt Master Air Waybill.

Referring to FIGS. 9 and 10, FIG. 9 shows a picture of a skirt Master Air Waybill. FIG. 10 shows another picture of a skirt Master Air Waybill. If the skirt station 12 intends to build consol by itself, select [Station] in Issuer Type when the skirt Master Air Waybill MAWB1 is established. Furthermore, the system may automatically display the MAWB Type as [Co-Load Out to DLMERCO], as shown in FIG. 10.

In Step S141, after the consol building is completed, the user may click the [eManifest] button, and the skirt data input/output module 1222 of the skirt server 122 transfers a skirt electronic warehouse receipt E2 to the hub server 142. The system may transfer data to the hub server 142 of the hub station 14 for the user to perform subsequent operations.

In Step S142, the user of the hub station 14 may continue to handle the consol freight (i.e. the skirt Master Air Waybill, SMAWB) sent from the skirt station 12. In Step S1421, if the data of the skirt Master Air Waybill SMAWB is not filled in detail, click the [Refresh] button on the waybill input picture of the skirt Master Air Waybill, which is not shown in the figure. The system may capture the data to the hub server 142 from the skirt storage module 1228 of the skirt station 12, and then refresh the data.

In Step S143, the hub server 142 determines whether to build consol of the skirt Master Air Waybill SMAWB transferred from the skirt server 122.

In Step S144, if the hub server 142 determines to build consol of the skirt Master Air Waybill SMAWB transferred from the skirt server 122, the hub server 142 builds consol of the skirt Master Air Waybill SMAWB to form the hub Master Air Waybill MAWB2. The hub server generates a hub Master Air Waybill number No2 corresponding to the skirt Master Air Waybill SMAWB, and transfers the hub Master Air Waybill number No2 and a Carrier Book F1 to the skirt server 122. Moreover, when the consol of this freight has been built by the hub server 142, the waybill input picture of the hub Master Air Waybill MAWB2 presents the hub Master Air Waybill number No2 and the Carrier Book information F1, which are not shown in the figure.

In Step S145, the hub server 142 transfers a hub electronic warehouse receipt E3 to the import station 18, as shown in FIG. 1, to calculate an estimated cost C2, and then transfers the estimated cost C2 to the skirt server 122.

While the present invention has been described with reference to certain preferred embodiments, those of skill in the art will appreciate that the above preferred embodiments are only used to explain the present invention and does not limit the protection scope of the present invention. Various modifications, equivalent replacements, improvements and so on without departing from the spirit and scope of the invention as recited in the claims, are all included in the rights protection scope of the present invention.

I claim:

1. A consolidation yield management method, adopting computer network automation operations to provide online management control over a consolidation yield management system in full scale, comprising:

providing at least one skirt server, for establishing a skirt House Air Waybill or a skirt Master Air Waybill of a skirt station;

providing a hub server, connected with the skirt server through a network system, for receiving and transferring the skirt House Air Waybill to a hub station to establish a hub Master Air Waybill;

for each of a plurality of shipments, the skirt server choosing whether to perform an operation of building consol or an operation of non-building consol, wherein the operation of non-building consol is an operation which chooses not to build a consol by the skirt server, and wherein the skirt server chooses to perform an operation of building consol for at least one of the plurality of shipments and the skirt server chooses to perform an operation of non-building consol for at least one of the plurality of shipments;

if the skirt server chooses to perform the operation of non-building consol, the skirt server establishing the skirt House Air Waybill, generating a skirt House Air Waybill number corresponding to the skirt House Air Waybill, transferring the skirt House Air Waybill and the skirt House Air Waybill number to the hub server, and subsequently the hub server choosing whether to build consol of the skirt House Air Waybill or not, wherein if the hub server chooses to build consol of the skirt House Air Waybill, the hub server building consol of the skirt House Air Waybill to the hub Master Air Waybill, generating a hub Master Air Waybill number corresponding to the hub Master Air Waybill, and then transferring the hub Master Air Waybill number to the skirt server; and if the skirt server chooses to perform the operation of building consol, the skirt server establishing the skirt Master Air Waybill and transferring a skirt electronic warehouse receipt to the hub server, and the hub server determining whether to build consol of the skirt Master Air Waybill transferred by the skirt server, wherein if the hub server chooses to build consol of the skirt Master Air Waybill, the hub server forming the hub Master Air Waybill, generating a hub Master Air Waybill number corresponding to the skirt Master Air Waybill and transferring the hub Master Air Waybill number and a Carrier Book to the skirt server.

2. The method of claim 1, further comprising: the hub server transferring a hub electronic warehouse receipt to an import station to calculate an estimated cost and transferring the estimated cost to the skirt server.

3. The method of claim 2, further comprising: the hub server performing a confirmation step according to the estimated cost.

4. The method of claim 1, further comprising: synchronizing the skirt House Air Waybill between the hub server and the skirt server in real time.

* * * * *